US010219207B2

(12) United States Patent
Jamadagni et al.

(10) Patent No.: US 10,219,207 B2
(45) Date of Patent: Feb. 26, 2019

(54) METHOD AND SYSTEM FOR SELECTIVE ACCESS CONTROL WITH ENSURED SERVICE CONTINUITY GUARANTEES (71) Applicant: Samsung Electronics Co., Ltd., Gyeonggi-do (KR)

(72) Inventors: Satish Nanjunda Swamy Jamadagni, Bangalore (IN); Rajavelsamy Rajadurai, Bangalore (IN); Song-Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/385,139

(22) PCT Filed: Mar. 12, 2013

(86) PCT No.: PCT/KR2013/001991
§ 371 (c)(1),
(2) Date: Sep. 12, 2014

(87) PCT Pub. No.: WO2013/137629
PCT Pub. Date: Sep. 19, 2013

(65) Prior Publication Data
US 2015/0055447 A1    Feb. 26, 2015

(30) Foreign Application Priority Data

Mar. 12, 2012  (IN) .............................. 913/CHE/2012

(51) Int. Cl.
H04W 48/18    (2009.01)
H04W 48/02    (2009.01)
(Continued)

(52) U.S. Cl.
CPC ............. *H04W 48/18* (2013.01); *H04W 4/70* (2018.02); *H04W 28/0289* (2013.01);
(Continued)

(58) Field of Classification Search
CPC ....... H04W 48/18; H04W 4/70; H04W 76/18; H04W 28/0289; H04W 48/02; H04W 84/042
See application file for complete search history.

(56) References Cited

U.S. PATENT DOCUMENTS

2005/0090224 A1    4/2005  Dorsey et al.
2006/0003764 A1*   1/2006  Saglam ................. H04W 48/16
                                              455/432.1
(Continued)

FOREIGN PATENT DOCUMENTS

CN    101161020 A    4/2008
CN    101500270 A    8/2009
(Continued)

OTHER PUBLICATIONS

International Search Report dated Jun. 28, 2013 in connection with International Patent Application No. PCT/KR2013/001991, 3 pages.
(Continued)

*Primary Examiner* — Hashim S Bhatti (57) ABSTRACT

A method and system for providing a continued service to user equipment (UE) under overload conditions is disclosed. A primary network undertakes a protective measure under unable to serve conditions by commanding a change in the UE network access behavior so that the UE can move to the secondary PLMN. After receiving the indication from the primary network, the UE connects to the secondary network and continues to obtain the services from the secondary network. The secondary PLMN ID can be sent to the UE in system information. Further, the information like overload indication, secondary PLMN ID and the time for which the UE can obtain the services from the secondary PLMN ID can be sent to individual UEs over dedicated messages either on an Access Stratum (AS) message or over a Non Access Stratum (NAS) message.

14 Claims, 3 Drawing Sheets (51) Int. Cl.
*H04W 28/02* (2009.01)
*H04W 76/18* (2018.01)
*H04W 4/70* (2018.01)
*H04W 84/04* (2009.01)

(52) U.S. Cl.
CPC ........... *H04W 48/02* (2013.01); *H04W 76/18* (2018.02); *H04W 84/042* (2013.01)

(56) References Cited

U.S. PATENT DOCUMENTS

| | | | |
|---|---|---|---|
| 2006/0094397 A1 | 5/2006 | Raghuram et al. | |
| 2006/0183472 A1 | 8/2006 | Nookala et al. | |
| 2007/0230420 A1* | 10/2007 | Bumiller | H04W 48/18 370/338 |
| 2008/0081622 A1 | 4/2008 | Gunaratnam et al. | |
| 2008/0102896 A1* | 5/2008 | Wang | H04W 36/34 455/560 |
| 2008/0205413 A1 | 8/2008 | Purnadi et al. | |
| 2009/0215446 A1* | 8/2009 | Hapsari | H04W 48/18 455/432.1 |
| 2010/0144307 A1 | 6/2010 | Wu | |
| 2010/0297979 A1* | 11/2010 | Watfa | H04W 8/205 455/404.1 |
| 2011/0014922 A1* | 1/2011 | Jen | H04W 74/002 455/450 |
| 2011/0249624 A1* | 10/2011 | Ramachandran | H04W 48/18 370/328 |
| 2012/0178449 A1* | 7/2012 | Liao | H04W 60/00 455/435.2 |
| 2012/0225670 A1* | 9/2012 | Cheng | H04W 60/00 455/456.2 |
| 2012/0294144 A1* | 11/2012 | Niemi | H04W 36/0022 370/230 |
| 2013/0142042 A1* | 6/2013 | Garcia Martin | H04L 12/5692 370/230 |

FOREIGN PATENT DOCUMENTS

| | | |
|---|---|---|
| CN | 101622901 A | 1/2010 |
| CN | 101754417 A | 6/2010 |
| CN | 101945450 A | 1/2011 |
| CN | 101951670 A | 1/2011 |
| EP | 2701449 A2 | 2/2014 |

OTHER PUBLICATIONS

Written Opinion of International Searching Authority dated Jun. 28, 2013 in connection with International Patent Application No. PCT/KR2013/001991, 7 pages.

ETSI TS 123 251 V9.4.0, "Universal Mobile Telecommunications System (UMTS); LTE; Network Sharing; Architecture and Functional Description (3GPP TS 23.251 Version 9.4.0 Release 9)", Mar. 2011, 22 pages.

Gavin Horn, "3GPP Femtocells: Architecture and Protocols", <URL: http://www.qualcomm.com/media/documents.3gpp-femtocells-architecture-and-protocols>, Oct. 26, 2010, 64 pages.

3GPP TS 36.300 V10.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, (Release 10)"; Mar. 2011, 197 pages.

Extended European Search Report dated Nov. 6, 2015 in connection with European Patent Application No. 13760331.2, 13 pages.

3GPP TSG CT WG1 Meeting #58; "Clarification on additions EMM cause values"; C1-091936; Sophia Antipolis France; Apr. 20-24, 2009; 13 pages.

3GPP TSG SA WG2 Meeting #81; "Corrections and additional to the MTC specific ACB and RRC connection reject functions"; S2-104700; Prague, Czech Republic; Oct. 11-15, 2010; 5 pages.

3GPP TSG RAN2 Meeting #72; "Introduction of NAS Wait Time"; R2-110257; Jacksonville, USA; Nov. 15-19, 2010, 13 pages.

The Second Office Action regarding Chinese Patent Application No. 201380013969.6, dated Feb. 2, 2018, 20 pages.

Foreign Communication from Related Counterpart Application; Chinese Patent Application No. 201380013969.6; Text of the First Office Action dated Jun. 30, 2017; 50 pages.

\* cited by examiner

METHOD AND SYSTEM FOR SELECTIVE ACCESS CONTROL WITH ENSURED SERVICE CONTINUITY GUARANTEES

CROSS-REFERENCE TO RELATED APPLICATION(S)

The present application claims priority under 35 U.S.C. § 365 to International Patent Application No. PCT/KR2013/001991 filed Mar. 12, 2013, entitled "METHOD AND SYSTEM FOR SELECTIVE ACCESS CONTROL WITH ENSURED SERVICE CONTINUITY GUARANTEES". International Patent Application No. PCT/KR2013/001991 claims priority under 35 U.S.C. § 365 and/or 35 U.S.C. § 119(a) to Indian Patent Application No, 913/CHE/2012 filed Mar. 12, 2012 and which are incorporated herein by reference into the present disclosure as if fully set forth herein.

TECHNICAL FIELD

The present invention relates to cellular networks, and more particularly relates to a method and system for providing continued service to user devices under unable to serve conditions.

BACKGROUND ART

Machine Type Communication (MTC) devices (sometimes referred to as Machine-to-Machine or M2M devices) are increasingly being used for a variety of applications. Their numbers are expected to grow at a high rate. MTC devices are typically automated data reporting systems such as utility meters or status reporting devices. MTC devices can be standalone devices serving one application: for example smart metering devices or can be regular cellular network User Equipments (UE) with MTC applications.

The MTC applications are likely to have significantly different usage or operational characteristics from other types of User Equipment (UE) applications. Such devices may be programmed to send data at a specific time, for example late at night. Also, other types of MTC devices may be triggered by specific events, such as a burglar alarm. Many of these may activated by the same event (for example, a power cut or earthquake). In any event, the volume of data transmitted and received by such devices is often low.

It has conventionally been understood that nearly all MTC devices (or at least 95%) will operate on their home cellular radio network, referred to as the Home Public Land Mobile Network (HPLMN). This is identified by the PLMN-ID of their International Mobile Subscriber Identity (IMSI). It has therefore been thought that network operators would be able to manage the large number of MTC devices by dimensioning their networks accordingly. Hence, MTC devices are generally expected to act and to be treated no differently from any other type of UE. In some critical network error conditions, where the HPLMN is unable to serve some particular device, then the network enables access barring and makes the UE to try after some time, by providing back-off timer values. From a UE perspective, since the HPLMN is available, the UEs will keep on trying to attach with the HPLMN. This access barring mechanism will make the UE to keep trying access attempts in the HPLMN and this will drain the device battery power faster. Also if the network enabled the access barring due to overload condition, this frequent attempts from the barred UEs will further make the network overload and consumes the network resources unnecessarily, as the network is not sure when it can recover from such unable to serve condition. It has to be understood that with the existing Access Class Barring/Extended Access Barring (ACB/EAB) mechanism wireless devices like the MTC devices can get into no service scenarios and this amounts to non-service availability which has regulatory and legal implications as users are promised service by an operator. Operators want to avoid this situation and are therefore looking at an appropriate technical solution.

An appropriate solution mechanism was so far not possible as operators did not want to let another operator to serve their subscribers within a particular service area and technically the PLMN selection hierarchy was so designed to avoid any attachment of a UE to a not intended operator network. Also, as the PLMN selection mechanism was preprogrammed or prelisted into a Subscriber Identity Module (SIM), any drastic PLMN selection changes was not possible. In the current mechanisms, networks do not have the option to make the UEs to try to attach other network immediately or try to attach the same PLMN with different radio access technology, if the highest priority PLMN (like HPLMN) is available. Going forward it is also possible that network operators will implement dynamic spectrum sharing or dynamic inter operator policies and when such policies are implemented and network operator may use such additional spectrum or additional rights to offload to other operators when there exists no mechanism to offload users to such additional spectrum or make use of such additional rights for possibly offloading to other operator networks dynamically based on the said operator network conditions and policies.

The introduction of a large number of MTC devices leads to overload conditions in Long Term Evolution (LTE) networks. Such overload scenarios could lead to severe network failure and service disruptions. Recently 3GPP has started discussing over load issues in LTE network due to the introduction of a large number of MTC devices. Also typically the network operators face two types of overload namely, Core network overload and Access network overload. The Core network overload can be independent of the access network overload. Commonly such overload condition in LTE networks leads to service disruption conditions for UEs or UEs tend to view this as severe network failure.

In an existing system, there exists an EAB mechanism to handle the issue of core network and access network overload, but this mechanism does not distinguish Access network overload and Core network overload. The EAB is similar to the ACB for the UEs. However, with the EAB or ACB mechanism if the core network is overloaded, the operator will invoke the EAB or ACB mechanism even though the radio access network (RAN) is not overloaded and the UEs will go in to wait time or back-off time. There is no way of using the services of another core network when the EAB or ACB is invoked by the network or the core network is unable to serve, even though an alternative core network could be a shared network or a roaming partner which can serve the UE.

Further, the mechanism of keeping the wireless devices into wait time will not serve all classes of devices. Some of the devices might require timely access guarantees and the EAB mechanism (extended wait time) might not guarantee access within the required time. There might, then be service disruption for MTC devices. In such cases enhancements or alternatives to the EAB mechanism is required for providing reliable access. Some wireless devices like the Low cost MTC devices might also be low on memory and might not have the capability to hold onto too much data when a network pushes the wireless device into an EAB/ACB mode. In such cases the devices might be forced to rewrite data on the old available data leading to loss of data.

Presently, with the extended access barring (EAB) mechanism or access class barring (ACB), the MTC devices or UEs are indicated about the non availability of service through indications in system information or through reject cause value in the reject messages. Such mechanism allows for time based barring of the MTC devices or UEs which leads to service disruption for these devices or in other words these devices perceive the network to be in a severe error condition leading to service disruption. This can cause unwanted delays for time critical MTC devices. Further, in the present scenario, there is no classical definition of what type applications are supported by the MTC devices. The applications can be latency tolerant application like smart meters or time critical applications like medical applications. Also currently the PLMN hierarchy provides a UE to go for next available PLMN in the hierarchy if a service from a PLMN is unavailable, instead the invocation of the EAB/ACB/reject mechanism will keep the UE in back-off mode and UE will keep re-attempting to access the network with the back-off timer value provided by the network, being increased after each attempt. This leads to long delays before a UE can come out of an EAB/ACB mechanism and access a network to transmit critical data. This current UE and network behavior mentioned in the specifications leads to unacceptable delays and leads to the UE perceiving severe network failure under the specified conditions. This is an unacceptable situation. Due to the above mentioned reasons, there is a need in the art to reestablish mechanisms to alter the UE behavior in order to support continued service for MTC or normal wireless devices when the network is unable to serve UEs under severe error conditions.

In the light of above discussion, it is desirable to have a method and system for providing continued services to a UE under severe network failure conditions like overload conditions. It is further desirable to have a method for indicating to a UE to invoke an alternate network access behavior instead of the existing UE behavior when an EAB/ACB is invoked by the network or under a severe network failure condition in the network. It has to be understood that a lack of such a service continuity solution for wireless devices is a serious regulatory issue and that this can affect the service experience of millions of devices which are getting added into the networks. Existing ACB/EAB mechanism becomes restrictive in their use as it was never conceived or designed with service continuity. This has been a failure on the part of the design community to address the issue of service continuity when handling the critical network error issues.

Further, an "unable to serve condition" in a network might not always indicate an error; other possible causes can be "better service available in another network" or "new spectrum becomes available to the operator" or "new inter operator policies becomes enabled" through which the operator now has the rights to use part of an other operators network resources and the current operator would then like to initiate an inter-operator offload to balance the network.

DISCLOSURE OF INVENTION

Technical Problem

An aspect of the present invention is to address at least the above-mentioned problems and/or disadvantages and to provide at least the advantages described below. Accordingly, an aspect of the present invention is to provide a mechanism for continued service to user equipment (UE) through a new alternate UE behavior when a network invokes either an EAB/ACB mechanism or when a network faces severe network failure conditions.

Another aspect of the present invention is to provide a mechanism for networks to indicate and invoke an alternative network selection behavior when the network invokes either an EAB/ACB mechanism or when a network faces severe network failure conditions.

Further another aspect of the present invention is to provide a mechanism for selective access control along with ensured service continuity guarantees.

Solution to Problem

In accordance with one aspect of the present invention, there is provided a method for providing continued services to a user equipment (UE) under unable to serve conditions in a communication network, wherein the method comprises receiving a network selection behavior change indication from a primary network for connecting to a secondary network immediately by the UE when the communication network is unable to serve the UE. Further the method comprises attempting to attach to the secondary network by the UE immediately, upon receiving the network selection behavior change indication from the primary network for obtaining the services.

In accordance with another aspect of the present invention, there is provided a communication network for providing services to a user equipment (UE) under unable to serve conditions, wherein the communication network is configured to provide an indication to the UE for executing a network selection behavior change, wherein the UE forgoes any invocation of back off timers and continued primary network access attempts. Further the communication network is configured to initiate an immediate connection attempt to a secondary network.

In accordance with further another aspect of the present invention, there is provided a user equipment (UE) for obtaining continued services from at least one primary network, secondary network under unable to serve conditions, wherein the UE comprises an integrated circuit. Further the integrated circuit comprises at least one processor, at least one memory. The memory comprises a computer program code within the integrated circuit. At least one memory and the computer program code with the at least one processor cause the UE to receive a network selection behavior change indication from the primary network for connecting to the secondary network immediately. Further the UE is configured to attempt to attach to the secondary network, upon receiving the network selection behavior change indication from the primary network for obtaining the services.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for providing a continued service to user equipment (UE) under network unable to serve conditions. The network indicates a switch in the UE network selection behavior to achieve continued service for UEs when network is under "unable to serve" conditions. The network indicates a behavior change in the way a UE should select an alternative network when EAB/ACB is invoked or when the network indicates severe network failure to a UE. Upon receiving an indication for access behavior change, the UE will seek an alternate network or same PLMN but different RAT as indicated by the primary or the serving network. The primary or the serving network optionally indicates the presence of a secondary network to the UE in a given area. The primary network also optionally indicates a secondary public land mobile network ID (PLMN ID) to the UE. After receiving an unable to serve indication from the primary network, UE connects to the secondary network immediately and try to obtain the services from the secondary network instead of following a behavior of starting a back off timer and waiting on the primary or the serving network.

Further, the primary network or serving network also optionally indicates the time duration for which the UE is attached to the secondary network or after what time duration, the UE try for the primary or secondary network. The method of supporting the "non availability of service" indication or the network access behavior change to user equipment or a group of UE devices can be achieved by modifying the system information in an LTE network.

In an embodiment, the system information can carry one or more of the unable to serve indication optionally along with a secondary PLMN ID and the time for which the MTC device can obtain service on a secondary PLMN or the time after which the UE try attaching to the primary or serving network.

In an embodiment, the UE can be a mobile phone, a smart phone, a Machine Type Communication (MTC) device or the like.

Throughout the description, the terms UE and MTC device are used interchangeably.

Throughout the description, the terms E-UTRAN, eNB and base station are used interchangeably.

Through the description, the terms overload condition, service disruption, and severe network failure is used interchangeably.

Throughout the description, the terms network access behavior and network selection behavior is used interchangeably.

Referring now to the drawings, and more particularly to FIGS. 1 through 8, where similar reference characters denote corresponding features consistently throughout the figures, there are shown preferred embodiments.

Figure 1:
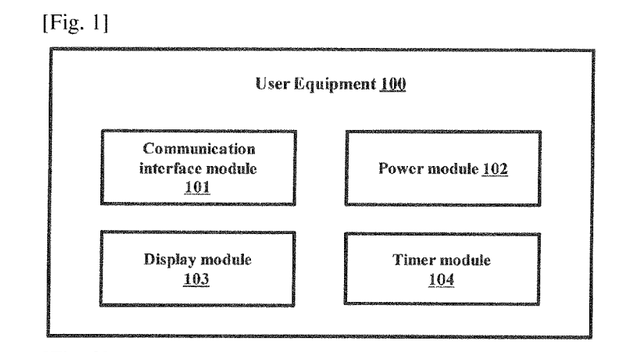
FIG. 1 illustrates a general block diagram of a user equipment, according to embodiments as disclosed herein.

FIG. 1 illustrates a general block diagram of user equipment, according to embodiments as disclosed herein. As depicted in the figure, the user equipment 100 comprises a communication interface module 101, a power module 102, a display module 103 and a timer module 104. The communication interface module 101 helps the UE to connect to the access network. The power module 102 holds the battery information and status of battery power in the user equipment 100. The battery information comprises the amount of charge that the device posses and the time period for which the user equipment 100 will be in operation and so on. The display module 103 of the user equipment 100 comprises of a user interface which can be a key pad or through any other means by which a user can input some data into the user equipment 100. The timer module 104 calculates the elapsed time provided by the primary network or home public land mobile network (HPLMN) and the UE attempts to access the primary network or HPLMN upon the expiry of the timer. The time period for which the UE should not try to attach with the primary PLMN is preconfigured in the UE or provided by the primary PLMN of the UE through a system information block (SIB) or Access Stratum (AS) message or Non Access Stratum (NAS) message.

In an embodiment, the primary network is the serving network of the UE. In another embodiment, the primary network is the UE selected network or attached network to obtain service. In further embodiment, the serving network can be the home PLMN of the UE.

In an embodiment, the secondary network is the next available highest priority PLMN in the PLMN selector list. In another embodiment, the secondary network is the PLMN ID communicated to the UE by the primary network. In a further embodiment, the secondary network being the primary network with different RAT (not the same PLMN+ RAT of the current primary network).

In an embodiment, the PLMN selector list is the "Operator Controlled PLMN Selector list with access technology" in the UE. In another embodiment, the PLMN selector list is the "User Controlled PLMN Selector list with access technology" in the UE. "HPLMN selector with Access Technology", "Forbidden PLMNs", "Equivalent HPLMN".

In another embodiment, UE PLMN selector list is a separate list of the PLMN in priority order used by the UE when the primary network indicates "unable to serve" indication.

Figure 2:
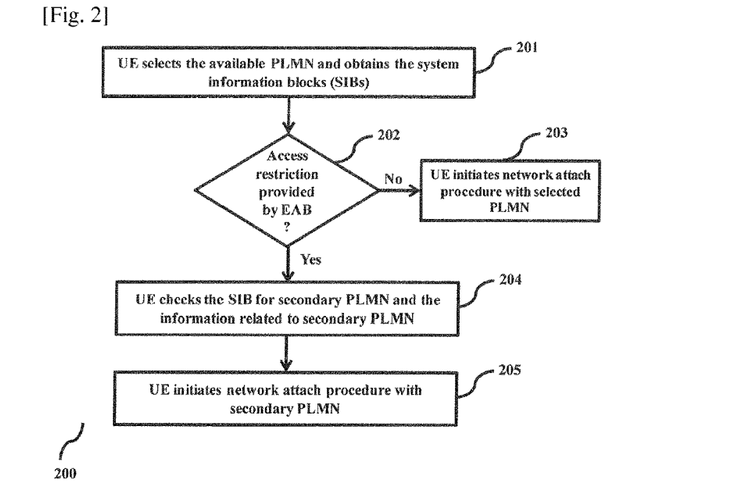
FIG. 2 illustrates a flow diagram explaining the various steps involved in providing service to the user equipment through inter-operator reselection, according to the embodiments as disclosed herein.

FIG. 2 illustrates a flow diagram explaining the various steps involved in providing service to the user equipment through inter-operator reselection, according to the embodiments as disclosed herein. As depicted in the flow diagram 200, initially the MTC device or the UE 100 selects (201) the available PLMN and obtains the system information. Upon obtaining the system information, UE 100 checks (202) whether the system information includes an "Extended Access Barring" or "Access Class Barring". If the UE determines that the system information has no access barring, then the UE 100 initiates (203) the network attach procedure with the selected PLMN. Further, if the UE 100 determines that the access restriction is provided in the system information, then UE 100 checks (204) for the secondary PLMN ID and the information related to the secondary PLMN ID within the system information block (SIB).

In an embodiment, the system information can carry one or more of the overload indication or the network access or selection behavior change indication, optionally secondary PLMN ID and optionally the time for which the UE 100 can obtain the services from the secondary PLMN ID or the time for which the UE 100 should not disturbed the primary network by initiating access procedures. In another embodiment, the time value for which the UE 100 should not disturbed the primary network by initiating access procedures is preconfigured in the UE 100.

The UE 100 obtains the secondary PLMN ID from the SIB and the UE initiates (205) the network attach procedure with the obtained PLMN ID.

In an embodiment, the information like non availability of service indication, secondary PLMN ID and the time for which the UE 100 can obtain the services from the secondary PLMN ID can be provided in the system information.

In an embodiment, the system information can carry one or more of the non availability of service indication, secondary PLMN ID and the time for which the UE 100 can obtain the services from the secondary PLMN ID.

In another embodiment, the information like unable to serve indication, optionally secondary PLMN ID and optionally the time for which the UE 100 can obtain the services from the secondary PLMN ID can be sent to individual UEs over dedicated messages either on an Access Stratum (AS) message or over a Non Access Stratum (NAS) message.

The various actions in flow diagram 200 may be performed in the order presented, in a different order or simultaneously. Further, in some embodiments, some actions listed in FIG. 2 may be omitted.

Figure 3:
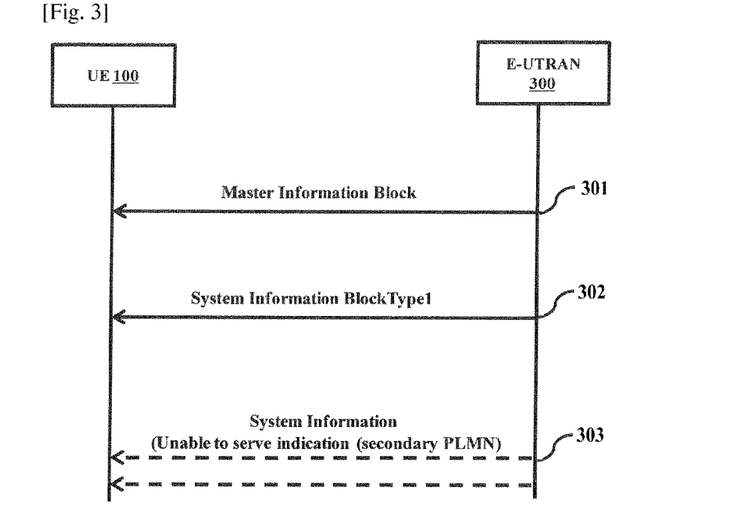
FIG. 3 illustrates a sequence diagram for indicating the user equipment with a unable to serve indication using system information block, according to the embodiments as disclosed herein.

FIG. 3 illustrates a sequence diagram for indicating the user equipment with a unable to serve indication using system information block, according to the embodiments as disclosed herein. As depicted in the figure, in step 301, the access network (E-UTRAN 300) broadcasts the master information block (MIB) to the UE. Further, in step 303, the UE 100 also obtains the system information block type 1 (SIB1) from the E-UTRAN 300. In step 305, the access network 300 broadcasts the EAB along with the unable to serve indication, optionally secondary PLMN to the UE 100 in the system information, as shown in the figure.

In an embodiment, the E-UTRAN 300 broadcasts the System Information Block Type2 (SIB2) including the unable to serve indication and optionally secondary PLMN ID.

SIB2 is taken as an example in the above embodiment and the parts of the information can be provided in different system information chunks. This information can also be defined as a Information Element (IE) or the information can be sent separate system information.

SystemInformationBlockType2

The IE SystemInformationBlockType2 contains radio resource configuration information that is common for all UEs.

NOTE: UE timers and constants related to functionality for which parameters are provided in another SIB are included in the corresponding SIB.

Tables 1 and 2 below show information element of the SystemInformationBlockType2 according to an embodiment of the present invention.

TABLE 1

```
-- ASN1START
SystemInformationBlockType2 ::=            SEQUENCE {
    ac-BarringInfo                         SEQUENCE {
        ac-BarringForEmergency                 BOOLEAN,
        ac-BarringForMO-Signalling                 AC-BarringConfig
OPTIONAL,    -- Need OP
        ac-BarringForMO-Data                   AC-BarringConfig
        OPTIONAL    -- Need OP
    }
    OPTIONAL,    -- Need OP
    radioResourceConfigCommon
    RadioResourceConfigCommonSIB,
    ue-TimersAndConstants                  UE-TimersAndConstants,
    freqInfo                               SEQUENCE {
        ul-CarrierFreq                         ARFCN-ValueEUTRA
        OPTIONAL,    -- Need OP
        ul-Bandwidth                           ENUMERATED {n6, n15, n25, n50,n75, n100}
        OPTIONAL,    -- Need OP
        additionalSpectrumEmission
        AdditionalSpectrumEmission
    ),
    mbsfn-SubframeConfigList               MBSFN-SubframeConfigList
```

TABLE 1-continued

```
OPTIONAL,      -- Need OR
    timeAlignmentTimerCommon        TimeAlignment-rimer,
    ...,
    lateNonCriticalExtension        OCTET STRING
    OPTIONAL,  -- Need OP
    [[ ssac-BarringForMMTEL-Voice-r9    AC-BarringConfig
OPTIONAL,      -- Need OP
        ssac-BarringForMMTEL-Video-r9   AC-BarringConfig
OPTIONAL       -- Need OP
    ]],
[[ ac-BarringForCSFB-r10                AC-BarringConfig
    OPTIONAL   --Need OP
    ]]
    [[ ac-BarringForMTC-r10             AC-BarringConfig
    OPTIONAL   -- Need OP
    ]]
}
```

TABLE 2

```
AC-BarringConfig ::=         SEQUENCE {
    ac-BarringFactor             ENUMERATED {
                                 p00, p05, p10, p15, p20, p25, p30, p40,
                                 p50, p60, p70, p75, p80, p85, p90, p95},
    ac-BarringTime               ENUMERATED {s4, s8, s16, s32, s64, s128, s256,
s512},
    ac-BarringForSpecialAC       BIT STRING (SIZE(5))
    ac-SecondaryPLMN             SPLMN-Identity
    ac- BarringTimeLpd           ENUMERATED {seconds},
    )
    MBSFN-SubframeConfigList ::= SEQUENCE(SIZE(1..maxrvMBSFN-Allocations))OF
MBSFN-SubframeConfig
-- ASN1STOP
```

Table 3 below shows field descriptions of the SystemInformationBlockType2 according to an embodiment of the present invention.

TABLE 3

SystemInformationBlockType2 field descriptions ac-BarringFactor

If the random number drawn by the UE is lower than this value, access is allowed. Otherwise the access is barred. The values are interpreted in the range [0, 1): p00 = 0, p05 = 0.05, p10 = 0.10, . . . , p95 = 0.95, Values other than p00 can only be set if all bits of the corresponding ac-BarringForSpecialAC are set to 0.

ac-BarringForCSFB

Access class barring for mobile originating CS fallback.

ac-BarringForEmergency

Access class barring for AC 10.

ac-BarringForMO-Data

Access class barring for mobile originating calls.

ac-BarringForMO-Signalling

Access class barring for mobile originating signalling.

ac-BarringForSpecialAC

Access class barring for AC 11-15. The first/leftmost bit is for AC 11, the second bit is for AC 12, and so on.

ac-BarringTime

Mean access barring time value in seconds.

mbsfn-SubframeConfigList

Defines the subframes that are reserved for MBSFN in downlink.

ssac-BarringForMMTEL-Video

Service specific access class barring for MMTEL video originating calls.

TABLE 3-continued

SystemInformationBlockType2 field descriptions ssac-BarringForMMTEL-Voice

Service specific access class barring for MMTEL voice originating calls.
ac-BarringForMTC Access class barring for MTC
Secondary PLMN Barred low priority mobile to access the specified PLMN ID (bypassing PLMN selection procedure)
ac-BarringTimeLpd Mean access barring time value in seconds for Low Priority Device. Till this time mobile will be in the secondary PLMN.
ul-Bandwidth Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq For FDD: If absent, the (default) value determined from the default TX-RX frequency separation defined in TS 36.101 [42, table 5.7.3-1] applies.
For TDD: This parameter is absent and it is equal to the downlink frequency.

In an embodiment, the secondary PLMN (S-PLMN) is configured in the USIM by the network (HPLMN) of the UE 100. The SIB2 from HPLMN informs the UE with EAB and an indication to access S-PLMN.

In one embodiment, the secondary PLMN is the next available highest priority PLMN in the PLMN order/selector list configured by the primary network.

Further, the S-PLMN can be per-configured in the USIM of the UE 100 and this S-PLMN is used for accessing secondary network. The S-PLMN configuration in the USIM or in the MTC device can be either pre-configured by the network (HPLMN) based on subscription through Over the Air (OTA) or Operation and Management (OAM) (OMA DM or (U) SIM OTA procedures) configuration by the network dynamically.

In an embodiment, the list of the preferred PLMN is rearranged or new list is created, based on the high priority PLMN (network) conditions dynamically. For example, if the primary network is the highest PLMN ID in the UE PLMN selector list and currently the network is under severe network failure, then the primary network can indicate the OAM to rearrange the operator preferred PLMN list, so that primary PLMN will be in the last or totally removed. Then OAM will rearrange the preferred list accordingly.

SystemInformationBlockType2

The IE SystemInformationBlockType2 contains radio resource configuration information that is common for all UEs.

NOTE: UE timers and constants related to functionality for which parameters are provided in another SIB are included in the corresponding SIB.

Tables 4 and 5 below show information element of the SystemInformationBlockType2 according to another embodiment of the present invention.

TABLE 4

```
-- ASN1START
SystemInformationBlockType2 ::=        SEQUENCE {
    ac-BarringInfo                         SEQUENCE {
        ac-BarringForEmergency                 BOOLEAN,
        ac-BarringForMO-Signailing             AC-BarringConfig
OPTIONAL,   -- Need OP
        ac-BarringForMO-Data                   AC-BarringConfig
    OPTIONAL -- Need OP
    }
    OPTIONAL, -- Need OP
    radioResourceConfigCommon
    RadioResourceConfigCommonSIB,
    ue-TimersAndConstants                  UE-TimersAndConstants,
    freqInfo                               SEQUENCE {
        ul-CarrierFreq                         ARFCN-ValueEUTRA
    OPTIONAL, -- Need OP
        ul-Bandwidth                           ENUMERATED {n6, n15, n25, n50,
                                            n75,
n100}
        OPTIONAL, --Need OP
        additionalSpectrumEmission
        AdditionalSpectrumEmission
    },
        mbsfn-SubframeConfigList           MBSFN-SubframeConfigList
    OPTIONAL,   -- Need OR
        timeAlignmentTimerCommon           TimeAlignmentTimer,
```

TABLE 4-continued

```
    ...,
    lateNonCriticalExtension        OCTET STRING
OPTIONAL,   -- Need OP
    [[  ssac-BarringForMMTEL-Voice-r9    AC-BarringConfig
OPTIONAL,   -- Need OP
        ssac-BarringForMMTEL-Video-r9   AC-BarringConfig
OPTIONAL    -- Need OP
    ]],
    [[  ac-BarringForCSFB-r10           AC-BarringConfig
        OPTIONAL   -- Need OP
    ]]
    [[  ac-BarringForMTC-r10            AC-BarringConfig
        OPTIONAL   -- Need OP
    ]]
}
```

TABLE 5

```
AC-BarringConfig ::=    SEQUENCE {
    ac-BarringFactor        ENUMERATED {
                                p00, p05, p10, p15, p20, p25,
p30, p40,
                                p50, p60, p70, p75, p80, p85,
p90, p95},
    ac-BarringTime          ENUMERATED {s4, s8, s16,
s32, s64, s128, s256, s512},
    ac-BarringForSpecialAC  BIT STRING (SIZE(5))
    ac-SPLMNIndicator       BOOLEAN,
    ac- BarringTimeLpd      ENUMERATED {seconds},
}
MBSFN-SubframeConfigList ::= SEQUENCE(SIZE(1..max MBSFN-Allocations))
OF MBSFN-SubframeConfig
-- ASN1STOP
```

Table 6 below shows field descriptions of the SystemInformationBlockType2 according to another embodiment of the present invention.

TABLE 6

| SystemInformationBlockType2 field descriptions |
|---|
| ac-BarringFactor |
| If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0. |
| ac-BarringForCSFB |
| Access class barring for mobile originating CS fallback. |
| ac-BarringForEmergency |
| Access class barring for AC 10. |
| ac-BarringForMO-Data |
| Access class barring for mobile originating calls. |
| ac-BarringForMO-Signalling |
| Access class barring for mobile originating signalling. |
| ac-BarringForSpecialAC |
| Access class barring for AC 11-15. The first/leftmost bit is for AC 11, the second bit is for AC 12, and so on. |
| ac-BarringTime |
| Mean access barring time value in seconds. |
| mbsfn-SubframeConfigList |
| Defines the subframes that are reserved for MBSFN in downlink. |
| ssac-BarringForMMTEL-Video |
| Service specific access class barring for MMTEL video originating calls. |

TABLE 6-continued

SystemInformationBlockType2 field descriptions ssac-BarringForMMTEL-Voice

Service specific access class barring for MMTEL voice originating calls.
ac-BarringForMTC Access class barring for MTC
ac-SPLMNIndicator Barred mobile to access the S PLMN
ac-BarringTimeLpd Mean access barring time value in seconds for mobile. Till this time mobile will be in the
secondary PLMN and shall not attempt to attach with this PLMN.
ul-Bandwidth Parameter: transmission bandwidth configuration. $N_{RB}$, in uplink, see TS 36.101 [42, table 5.6-1].
Value n6 corresponds to 6 resource blocks, n15 to 15 resource blocks and so on. If for FDD this
parameter is absent, the uplink bandwidth is equal to the downlink bandwidth. For TDD this
parameter is absent and it is equal to the downlink bandwidth.
ul-CarrierFreq For FDD: If absent, the (default) value determined from the default TX-RX frequency separation
defined in TS 36.101 [42, table 5.7.3-1] applies.
For TDD: This parameter is absent and it is equal to the downlink frequency.

In an embodiment, there can be separate SIB with the above parameters, which will inform EAB along with SPLMN to access or indicator to indicate the EAP devices to access the SPLMN.

Table 7 below shows information element of the SystemInformationBlockType1x according to an embodiment of the present invention.

TABLE 7

```
-- ASN1START
SystemInformationBlockType1x-r11::=    SEQUENCE {
    ac-BarringExtInfo-r11              AC-BarringExtConfig-r11,
    lateNonCriticalExtension           OCTET STRING
    OPTIONAL   -- Need OP
    ...
}
AC-BarringExtConfig-r11 ::=            CHOICE {
    ac-BarringExtCommon-r11                AC-Barring ExtConfigSet-r11,
    ac-BarringExtPerPLMN-List-r11          SEQUENCE (SIZE (1..5)) OF AC-BarringConfigSet-
r11
}
  AC-BarringExtConfigSet-r11::=        CHOICE {
    nonBarred-r11                        NULL,
    barred-r11                           SEQUENCE (
      ac-BarringExt-r11                    BIT STRING (SIZE(10))
      ac-BarringExtCat-r11                 ENUMERATED {all, roaming, nonPreferred},
      ac-SecondaryPLMN                     SPLMN-Identity
      ac- BarringTimeLpd                   ENUMERATED
{seconds},
    }
}
-- ASN1STOP
```

Table 8 below shows field descriptions of the SystemInformationBlockType1x according to an embodiment of the present invention.

TABLE 8

SystemInformationBlockType1x field descriptions ac-BarringExtCommon

A single set of extended access class barring parameters, applicable for all PLMN.
ac-BarringExtPerPLMN-List A separate set of extended access class barring parameters per PLMN, listed in the same order as
the PLMNs occur in plmn-IdentityList in SystemInformationBlockType1.

TABLE 8-continued

SystemInformationBlockType1x field descriptions ac-BarringExtCat

Figure 4:
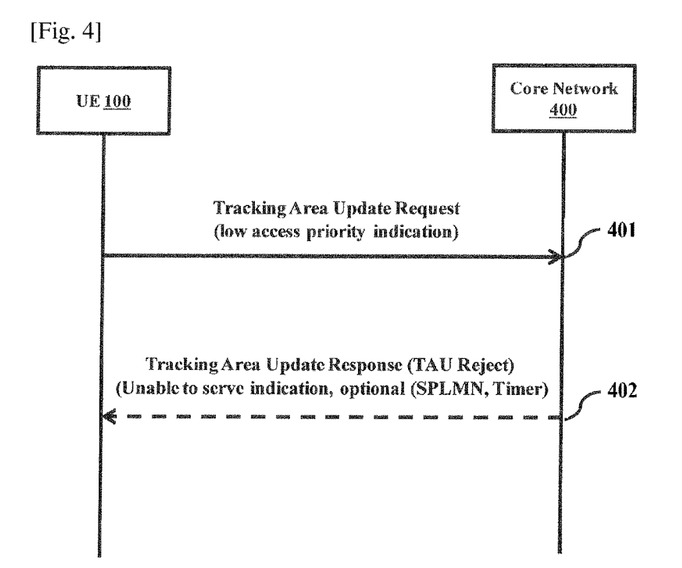
FIG. 4 illustrates a sequence diagram for indicating the UE with a unable to serve error cause value using non access stratum (NAS) reject message based approach, according to the embodiments as disclosed herein.

Indicates the category of UEs for which extended access barring applies. Value all corresponds to all UEs that are configured for EAB, value roaming corresponds to the UEs configured for EAB that are neither in their HPLMN nor in a PLMN that is equivalent to it, and value nonPreferred and corresponds to the UEs configured for EAB that are neither in the PLMN listed as most preferred PLMN of the country where the UE is roaming in the operator-defined PLMN selector list on the SM/USIM, nor in their HPLMN nor in a PLMN that is equivalent to their HPLMN, FIG. 4 illustrates a sequence diagram for indicating the UE with a unable to serve error cause value using non access stratum (NAS) reject message based approach, according to the embodiments as disclosed herein. The core network (HPLMN) 400 of the UE 100 optionally indicates the UE 100 with a timer for re-attempting the core network 400 and optional secondary PLMN, also for when said UE 100 is determined as a low priority access UE by the core network (HPLMN) using the NAS message.

In another embodiment, the timer value for which the UE 100 should not disturb the primary network by initiating NAS messages is preconfigured in the UE 100.

In an embodiment, the NAS reject messages being ATTACH REJECT message, TRACKING AREA UPDATE REJECT message, and a SERVICE REJECT message.

For mobile originated requests (services or updates), UEs may be configured for low access priority, if configured provide a low access priority indication to the core network 400 in NAS signaling. In step 401, when the UE 100 sends a (periodic) Tracking Area Update (TAU) request to the core network 400. The UE 100 may indicate a low priority indication in NAS signaling to the core network 400 through the TAU request. The core network (HPLMN) 400 receives the TAU request. The core network may be under unable to serve condition due to overload or network error conditions. Further, the core network (primary network) 400 undertakes a protective measure by commanding the UE 100 to move to a state where the UE 100 does not need to generate further signaling messages and move to the secondary PLMN immediately. In step 403, the NAS commanding being through a NAS reject message with "unable to serve" indication. On receiving the "unable to serve" error cause value, the UE will initiate PLMN selection procedure to attach with the secondary network.

In an embodiment, UE will be preconfigured with timer value, till this timer value elapses, the UE will not try to access the primary network.

In an embodiment, the core network can be Mobile Management Entity (MME), Serving Gateway (S-GW), PDN Gateway (P-GW) or enhanced NodeB or Radio network Controller or the like.

In an embodiment, the core network 400 allocates a timer value to the UE 100 for indicating the UE 100 to re-attempt to access the home PLMN (HPLMN) after expiration of the specified timer value.

In another embodiment, the UE 100 will not reattempt to access the Primary network and the RAT, but will try to access the Primary network through a different RAT.

Figure 5:
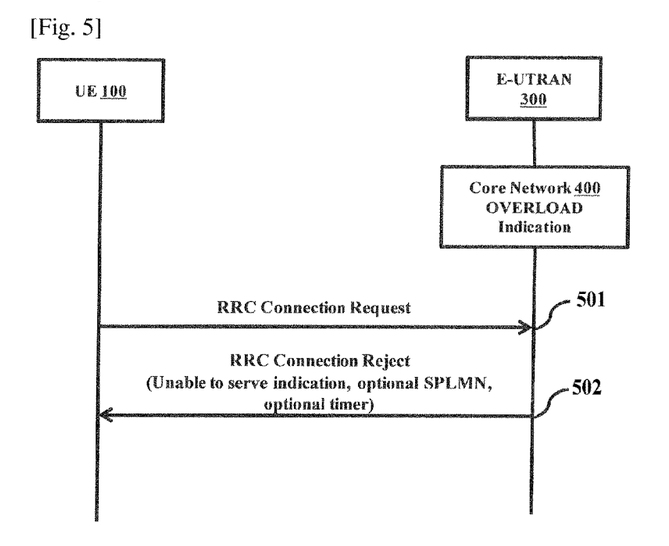
FIG. 5 illustrates a sequence diagram for indicating the UE with network access or selection behavior change indication using access stratum (AS) reject message based approach, according to the embodiments as disclosed herein.

FIG. 5 illustrates a sequence diagram for indicating the UE with network access or selection behavior change indication using access stratum (AS) reject message based approach, according to the embodiments as disclosed herein. As depicted in the sequence diagram, for mobile originated request in step 501, UEs may be configured for low access priority, if configured then, provide a low access priority indication to the E-UTRAN 300 (Access network) in Radio Resource Control (RRC) signaling. In one embodiment, in step 503, the E-UTRAN, indicating the UE with a unable to serve error cause value using access stratum (AS) reject message and optionally includes the time value till which the UE should not consider the primary network and radio access technology for access network selection.

In an embodiment, the core network 400 can allocate a timer value to the UE, to indicate when to re-attempt to access primary network. The secondary PLMN (SPLMN) and timer are included by the core network 400 in the OVERLOAD START message (S1 signaling) for the E-UTRAN to include in the RRC messages. In one embodiment, after receiving the RRC reject message with the error indication as "unable to serve", the UE de-prioritizes the primary network and radio access technology (RAT) and initiates a new network reselection procedure immediately.

In an embodiment, the access network is E-UTRAN or UTRAN or GERAN and the like.

When a network is in an overload condition, the primary network (access network) can negotiate with a secondary network provider (core network for example Airtel) for access rights for the primary network users.

In an embodiment, the core network 400 of the operator 1 can negotiate with the core network 400 of operator 2, if it can offload users to the secondary network through enhanced core network signaling. The transparent containers can be exchanged between the core networks of the two operators when the core network of one of the operators is found to experience overload conditions, to access the possibility offloading MTC/UE 100 users from one network to another network. If one of the networks gets a confirmation that it allows user offloading, the overloaded network can then indicate to the users of that network about the alternate PLMN to offload.

In an embodiment, the secondary PLMN can belong to another Radio access network technology. For example, offloading can be achieved from an LTE network to a GSM EDGE Radio Access Network (GERAN) and may having different PLMN identities and may belonging to different operators.

In an embodiment, the configured order of PLMN access is violated to achieve the secondary PLMN access for continued service access by MTC devices, if the SPLMN is included along with the unable to serve indication.

In general, most UEs are configured to attach and obtain services from the Home PLMN whenever the Home PLMN (primary network) is available.

In an embodiment, the primary PLMN indicates "unable to serve" to the UEs and to attach and obtain services from the secondary PLMN. In such a scenario, the periodic timers and temporary identities associated with the primary PLMN are turned off or deleted and a new explicit timer is started to retry the primary network. This new timer value can be set by the primary network in the SIB or in the NAS or in the AS message or the timer value is preconfigured in the UE.

Upon indication (unable to serve) by the primary network to a UE 100 to attach and obtain services from a secondary network, the UE 100 detaches from the primary network. Then UE 100 scans the frequencies associated with the secondary network (SPLMN) immediately and selects the best cell as per the cell selection criteria and attaches to the secondary network (SPLMN) by sending an attach message to the secondary network.

Figure 6:
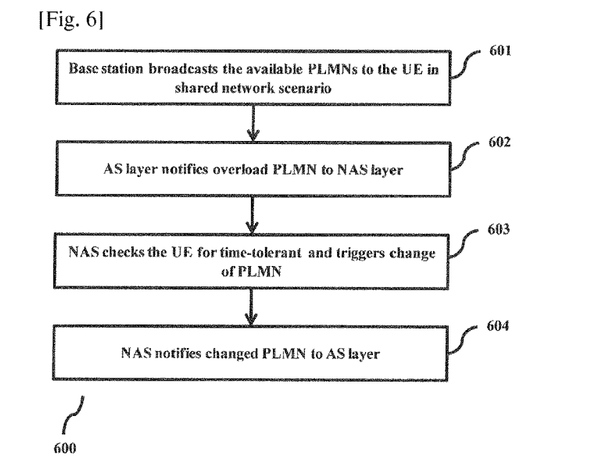
FIG. 6 illustrates a flow diagram for pre-configuration based approach for indicating the secondary PLMN to the UE, according to the embodiments as disclosed herein.

FIG. 6 illustrates a flow diagram for pre-configuration based approach for indicating the secondary PLMN to the UE, according to the embodiments as disclosed herein. The secondary PLMN is pre-configured in the UE 100 by the network or the service provider. If the primary PLMN of the UE explicitly indicates "unable to serve", then the UE automatically selects the configured next high priority PLMN by the primary network.

As depicted in the flow diagram 600, base station (eNodeB) broadcasts (601) the PLMNs to the UE 100, where the base station is shared by other access networks (for example PLMN A, PLMN B, PLMN C). If the home PLMN of a UE (say PLMN A) is overloaded, then the AS layer in the UE, indicates (602) that home PLMN is overloaded. Then the NAS layer of UE, checks (603) whether the required service is time controlled and if it is required service, then the NAS layer notifies (604) the AS layer to attach with the changed PLMN (either PLMN B or PLMN C) or secondary PLMN which is pre-configured in the UE (Universal Integrated Circuit Card (UICC)). Thus, the selection of PLMN is based on AS or NAS layer interaction within the UE 100. Further, the secondary PLMN (SPLMN) configuration in the USIM or in the device is either preconfigured by the network based on subscription through Over the Air (OTA) or Operation and Management (OAM) (OMA DM or (U) SIM OTA procedures) configuration by the network dynamically. The various actions in flow diagram 600 may be performed in the order presented, in a different order or simultaneously. Further, in some embodiments, some actions listed in FIG. 6 may be omitted.

In an embodiment, the network indicates the SPLMN through the NAS message during Attach or Location update procedure.

In an embodiment, when the Radio Access Network (RAN) or a base station is sharing one or more core network (for example Airtel, Vodafone and so on) the handover of inter core network (for example from Airtel to Vodafone) can be achieved by sending an alternate PLMN (A-PLMN) to the UE or MTC devices. Further, these devices (UEs) are routed to the other core networks through the radio access network (base station), which is being shared by the core networks.

In an embodiment, in network sharing scenario by core and access network, the base station (eNodeB) is pre-configured by a home PLMN (HPLMN) (say for example, PLMN A) to broadcast PLMN B (another core network, sharing the base station) in case of overloading in a primary network (PLMN A). The base station receives a S1-overload message from PLMN A or HPLMN for broadcasting PLMN B to the UEs.

Further, the base station checks whether the PLMN B is overloaded or not after receiving a S1-overload message from PLMN A or HPLMN of the UE 100. If the PLMN B is not overloaded, then it sends the PLMN B as the secondary PLMN in the EAB SIB for PLMN-A.

Figure 7:
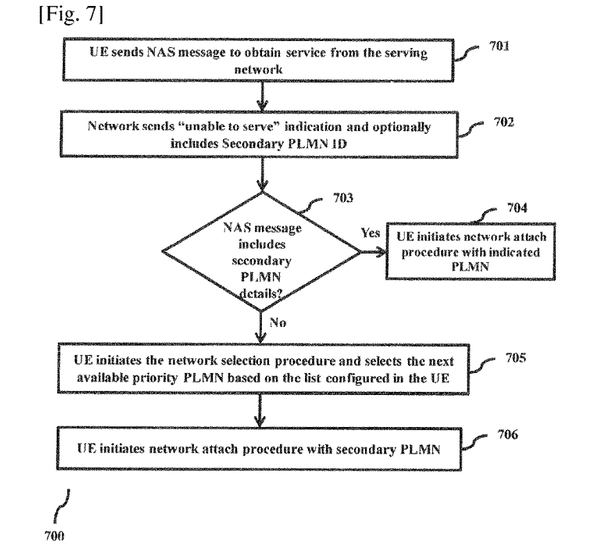
FIG. 7 illustrates a flow diagram explaining the process of providing service to the UE under unable to serve conditions, using NAS based approach, according to embodiments as disclosed herein.

FIG. 7 illustrates a flow diagram explaining the process of providing service to the UE under unable to serve conditions, using NAS based approach, according to embodiments as disclosed herein. As depicted in the flow diagram 700, initially the UE 100 sends (701) a Non Access Stratum (NAS) message to obtain services from the serving network. If the serving network is overloaded or under unable to serve conditions, then the network sends (702) an unable to serve indication along with a secondary PLMN ID (optional) to the UE 100.

In an embodiment, network can be under "unable to serve" condition due to overload, maintenance, severe network failure, network entity malfunctioning and so on.

In an embodiment, when the network is awarded with a new spectrum, new inter operator rights enablement, then the UE 100 attached to the secondary network immediately, upon receiving the network selection behavior change indication from the primary network for obtaining the services.

In an embodiment, the network sends an indication for UE, which comprises a network selection behavior change, time period which indicates the UE 100 for not accessing the network during the time period. The time period is received as code point or an offset of an existing time period in memory of UE 100 or an explicit value.

The UE accesses the secondary network, after expiration of the time period, recalls initial PLMN order which is changed upon receiving the "unable to serve" indication from the primary network.

Further, the UE 100 checks (703) whether the NAS message received from the network includes a secondary PLMN ID. If the UE 100 determines that the NAS message includes a secondary PLMN ID, and then the UE 100 initiates (704) the network attach procedure using the indicated PLMN (secondary PLMN) immediately.

If the UE does not identify the secondary PLMN ID from the NAS message, then the UE 100, then the UE initiates (705) the network selection procedure and selects the next available priority PLMN based on the PLMN selector list configured in the UE 100.

Further, the UE 100 initiates (706) the network attach procedure with the selected PLMN.

The various actions in flow diagram 700 may be performed in the order presented, in a different order or simultaneously. Further, in some embodiments, some actions listed in FIG. 7 may be omitted.

Figure 8:
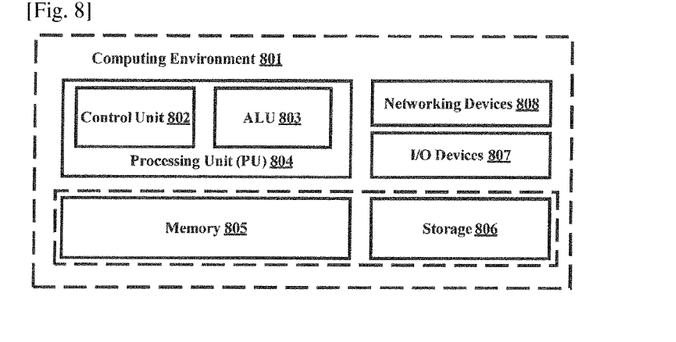
FIG. 8 illustrates a computing environment implementing the method and system for providing service to the user equipment under unable to serve conditions in a network.

FIG. 8 illustrates a computing environment implementing the method and system for providing service to user equipment under unable to serve conditions in a network. As depicted the computing environment 801 comprises at least one processing unit 804 that is equipped with a control unit 802 and an Arithmetic Logic Unit (ALU) 803, a memory 805, a storage unit 806, plurality of networking devices 808 and a plurality Input output (I/O) devices 807. The processing unit 804 is responsible for processing the instructions of the algorithm. The processing unit 804 receives commands from the control unit in order to perform its processing. Further, any logical and arithmetic operations involved in the execution of the instructions are computed with the help of the ALU 803.

The overall computing environment 801 can be composed of multiple homogeneous and/or heterogeneous cores, multiple CPUs of different kinds, special media and other accelerators. The processing unit 804 is responsible for processing the instructions of the algorithm. Further, the plurality of processing units 804 may be located on a single chip or over multiple chips.

The algorithm comprising of instructions and codes required for the implementation are stored in either the memory unit 805 or the storage 806 or both. At the time of execution, the instructions may be fetched from the corresponding memory 805 and/or storage 806, and executed by the processing unit 804.

In case of any hardware implementations various networking devices 808 or external I/O devices 807 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 3, 4, 5 and 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for performing an access control by a user equipment (UE) in a communication network, the method comprising:
    receiving, from a first network, a message including information indicating a network failure if the UE is unable to be served by the first network;
    selecting a candidate public land mobile network (PLMN) for a PLMN selection, wherein the UE does not select the first network as the candidate PLMN while a timer based on a timer value preconfigured by the first network is running; and
    performing the PLMN selection based on the information indicating the network failure, wherein the message further includes an identifier of a secondary PLMN and a time for which the UE is able to obtain a service by the secondary PLMN.

2. The method of claim 1, wherein the information includes a cause value of the network failure.

3. The method of claim 1, wherein at least one of a PLMN or a radio access technology (RAT) of a second network to which the PLMN selection is performed to attach is different from that of the first network.

4. The method of claim 1, wherein the message is a non-access stratum (NAS) message.

5. The method of claim 4, wherein the NAS message includes a tracking area update reject message.

6. A user equipment (UE) for performing an access control in a communication network, the UE comprising:
    a receiver configured to receive a message from a first network, the message including information indicating a network failure if the UE is unable to be served by the first network; and
    at least one controller configured to:
        select a candidate public land mobile network (PLMN) for a PLMN selection, wherein the UE does not select the first network as the candidate PLMN while a timer based on a timer value preconfigured by the first network is running; and
        perform the PLMN selection based on the information indicating the network failure, wherein the message further includes an identifier of a secondary PLMN and a time for which the UE is able to obtain a service by the secondary PLMN.

7. The UE of claim 6, wherein the information includes a cause value of the network failure.

8. The UE of claim 6, wherein at least one of a PLMN or a radio access technology (RAT) of a second network to which the PLMN selection is performed to attach is different from that of the first network.

9. The UE of claim 6, wherein the message is a non-access stratum (NAS) message.

10. The UE of claim 9, wherein the NAS message includes a tracking area update reject message.

11. A first network for performing an access control in a communication network, the first network comprising a transmitter configured to transmit a message to a user equipment (UE) if the first network is unable to serve the UE, wherein the message includes information indicating a network failure, wherein a public land mobile network (PLMN) selection is performed by the UE based on the information indicating the network failure, and
    wherein the first network is not selected by the UE as a candidate PLMN for the PLMN selection while a timer based on a timer value preconfigured by the first network is running, if the message from the first network is received by the UE, wherein the message further includes an identifier of a secondary PLMN and a time for which the UE is able to obtain a service by the secondary PLMN.

12. The first network of claim 11, wherein the information includes a cause value of the network failure.

13. The first network of claim 11, wherein at least one of a PLMN or a radio access technology (RAT) of a second network to which the PLMN selection is performed to attach is different from that of the first network.

14. The first network of claim 11, wherein the message is a non-access stratum (NAS) message.

* * * * *